(12) United States Patent
Franklin et al.

(10) Patent No.: US 9,158,927 B1
(45) Date of Patent: Oct. 13, 2015

(54) CROSS-REGION RECOVERY OF ENCRYPTED, ERASURE-ENCODED DATA

(71) Applicant: Amazon Technologies, Inc., Seattle, WA (US)

(72) Inventors: Paul David Franklin, Lake Forest Park, WA (US); Bryan James Donlan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 89 days.

(21) Appl. No.: 13/925,497

(22) Filed: Jun. 24, 2013

(51) Int. Cl.
*G06F 21/00* (2013.01)
*G06F 21/60* (2013.01)

(52) U.S. Cl.
CPC ................................. *G06F 21/602* (2013.01)

(58) Field of Classification Search
USPC .................................................. 713/189–194
See application file for complete search history.

(56) References Cited

U.S. PATENT DOCUMENTS

| | | | |
|---|---|---|---|
| 6,738,380 | B1 | 5/2004 | Imai et al. |
| 8,504,535 | B1 | 8/2013 | He et al. |
| 8,522,109 | B2 | 8/2013 | Murakami et al. |
| 8,806,296 | B1 | 8/2014 | Lazier |
| 8,850,288 | B1 | 9/2014 | Lazier et al. |
| 8,869,001 | B1 | 10/2014 | Lazier |
| 2006/0080574 | A1 | 4/2006 | Saito et al. |
| 2006/0155946 | A1 | 7/2006 | Ji |
| 2008/0221856 | A1 | 9/2008 | Dubnicki et al. |
| 2009/0222585 | A1 | 9/2009 | Khalil et al. |
| 2010/0094986 | A1 | 4/2010 | Zuckerman et al. |
| 2010/0095012 | A1* | 4/2010 | Zuckerman et al. .......... 709/231 |
| 2010/0095184 | A1 | 4/2010 | Zuckerman et al. |
| 2010/0100587 | A1 | 4/2010 | Teglovic et al. |
| 2010/0174968 | A1 | 7/2010 | Charles et al. |
| 2011/0029711 | A1 | 2/2011 | Dhuse et al. |
| 2011/0029742 | A1 | 2/2011 | Grube et al. |
| 2011/0029809 | A1 | 2/2011 | Dhuse et al. |
| 2011/0087948 | A1 | 4/2011 | Murakami et al. |
| 2011/0197106 | A1 | 8/2011 | Kishigami et al. |
| 2013/0061116 | A1 | 3/2013 | Grube et al. |
| 2013/0204849 | A1 | 8/2013 | Chacko |
| 2014/0344531 | A1 | 11/2014 | Lazier |

OTHER PUBLICATIONS

An Efficient XOR-Scheduling Algorithm for Erasure Codes Encoding, Xu et al, 2009, pp. 504-513.*
U.S. Appl. No. 13/898,066, filed May 20, 2013, Donlan.

(Continued)

*Primary Examiner* — Ghazal Shehni
(74) *Attorney, Agent, or Firm* — Lee & Hayes, PLLC; Charles L. Warner

(57) ABSTRACT

Reliable and efficient storage and reconstruction of secure data files is provided. Encrypted fragments are generated by exclusive-OR (XOR) based erasure-encoding and XOR encryption of data files. At least some of the encrypted fragments, and preferably at least two copies of such encrypted fragments, are stored at two or more locations, such as but not limited to two or more servers in two or more regional storage systems. Fragments are retrieved from one or more of the multiple locations and the original data file is reconstructed, even if different encryption techniques have been used. If not enough valid fragments from that original data file can be identified then hash values, checksums, seeds, and other techniques may be used to distinguish files and to identify related or identical files which may be used to reconstruct the data file.

24 Claims, 7 Drawing Sheets

(56) References Cited

OTHER PUBLICATIONS

U.S. Appl. No. 13/898,071, filed May 20, 2013, Donlan.
Huang, C. et al., "Erasure Coding in Windows Azure Storage", Microsoft Corporation [online][retrieved on: May 22, 2013] retrieved from: http://research.microsoft.com/pubs/179583/LRC12-cheng%20webpage.pdf, 12 pps.
Weatherspoon, H. et al., "Erasure Coding vs. Replication: A Quantitative Comparison", Computer Science Division, University of California, Berkeley [online][retrieved on: May 22, 2013] retrieved from: http://www.cs.rice.edu/Conferences/IPTPS02/170.pdf, 11 pps.
U.S. Appl. No. 14/274,218, filed May 9, 2014, Donlan et al.

Hendricks, J. et al., "Verifying Distributed Erasure-Coded Data", PODS 2007, Aug. 12-15, 2007, Portland, Oregon, US [online][retrieved on: May 22, 2013] retrieved from: http://www.pdl.cmu.edu/PDL-FTP/SelfStar/podc07.pdf, pp. 139-145.
Nychis et al., Analysis of Erasure Coding in a Peer to Peer Backup System, May 2006, Carnegie Mellon University, pp. 1-13.
Office action for U.S. Appl. No. 13/898,071, mailed on Dec. 17, 2014, Donlan et al., "Recover of Corrupted Erasure-Coded Data Files", 10 pages.
Office action for U.S. Appl. No. 13/898,066, mailed on Dec. 18, 2014, Donlan et al., "Recover of Corrupted Erasure-Coded Data Files", 10 pages.

* cited by examiner

CROSS-REGION RECOVERY OF ENCRYPTED, ERASURE-ENCODED DATA

BACKGROUND

Data files, such as but not limited to pictures, documents, spreadsheets, videos, sound recordings, presentations, scans, etc., are important to businesses, governments, and individuals. These data files are often stored on personal computers, laptops, small (local) servers, or other similar devices. Lightning, fire, flood, theft, a hard drive error or failure, or other unfortunate event can, however, result in the loss of some or all of the data.

To provide for recovery of data in the event that it is no longer available from the various types of devices mentioned above, it is not uncommon for the data to be backed up on different storage media, or on another computing system. A single media or computing system may, however, suffer undetected failure or damage so that the backup copy is not available just when it is needed. One approach to provide for redundancy in storage of the data files is to place a copy of a data file on multiple different storage media and/or multiple data storage servers. This, however, can be expensive as the total storage space required is the size of the original data file multiplied by the number of devices on which the file is stored.

Another approach is to use erasure-encoding, which can reduce the size of the storage space required for reliable storage of a file when compared to the space required for storing a complete copy of the data file on multiple servers. Erasure-coding generates a mathematical construct of n fragments for a data file. Not all n fragments are required, however, in order to reconstruct the original data file. For example, in an m-of-n erasure-coding technique, erasure-encoding a data file produces n erasure-encoded fragments. When reconstruction of the data file is desired, only m non-identical, non-overlapping fragments are required to accurately construct the original data file.

Some users have data files that contain proprietary information, and there could be serious financial or other consequences if those data files were inadvertently released to the public. To avoid this problem, the data in such files is typically encrypted. The encryption process, however, may hinder or prevent combining fragments to recover the original data file.

DETAILED DESCRIPTION

Figure 1:
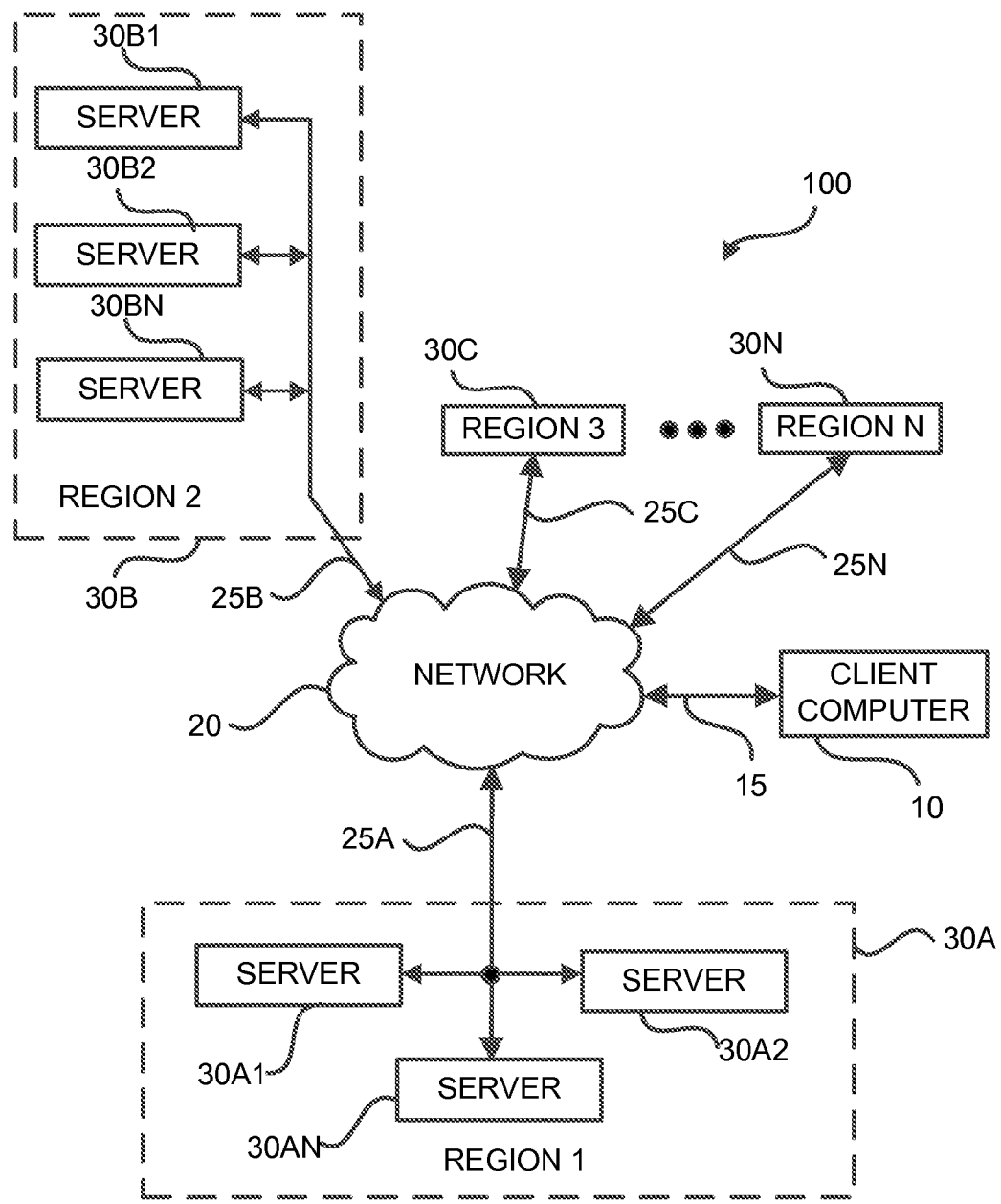
FIG. 1 is a network diagram showing one exemplary distributed system that can receive, store, retrieve, recover, and send data files using both encryption and erasure-encoding techniques.

The following detailed description is directed to concepts and technologies for recovering (reconstructing) data files from encrypted, erasure-encoded data, and for cross-region recovery of encrypted, erasure-encoded data. Briefly stated, erasure-coding schemes require a minimum number of erasure-encoded fragments to reconstruct a file. Also, some encryption techniques require the entire encrypted file for decryption. These characteristics can hinder or prevent reconstruction of an erasure-encoded and encrypted file if the available fragments were created using two different encryption techniques. If, however, the encryption technique is an exclusive-OR (XOR) technique, and the erasure-encoding technique is an XOR-based technique, then data files can be reconstructed using encrypted, erasure-encoded fragments, even when different encryption techniques may have been used, such as when the fragments are retrieved from different regional storage systems. Preferably, at least two copies of each of a minimum number of erasure-encoded and encrypted fragments of the data file are located among several servers, at least some of which may be in different regional storage systems. The servers in one regional storage system may apply a different encryption technique than, or the same encryption technique as, the servers in other regional storage systems. Encryption techniques are considered to be different from one another if they (1) use different encryption algorithms, or (2) use the same encryption algorithm but use different encryption keys.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types.

In the following detailed description, references are made to the accompanying drawings that form a part hereof, and in which are shown, by way of illustration, specific implementations or examples. Referring now to the drawings, in which like numerals represent like elements throughout the several figures, the storage and recovery of data files using both encryption and erasure-encoding will be presented.

FIG. 1 is a network diagram showing one exemplary distributed system 100 that can receive, store, retrieve, recover, and send data files using both encryption and encoding techniques on the data files, and is particularly useful for cross-region recovery of encrypted, erasure-encoded data, especially where different storage systems may use different encryption schemes. In the exemplary system 100 shown there is a client computer 10, a network 20, and two or more regional storage systems 30A, 30B, 30C, 30N, etc. The regional storage systems 30, which may also be known as server "farms", are independent systems. Two regional server systems 30 are independent if they differ in one or more characteristics such that an event, disaster, or failure with respect to one regional server system 30 will likely not adversely affect another regional server system. By way of example and not of limitations, regions are considered to be "independent" if they are served by different power systems, air conditioning systems, or are located in different rooms of a building, located in different buildings in the same area, located in different areas of a city, located in different cities, located in different states, located in in different countries, etc. These different independent regional storage systems are indicated as Region 1, Region 2, Region 3, Region N. Each independent regional storage system 30 has at least one server and preferably has two or more servers. For example, regional storage system 30A has servers 30A1, 30A2, 30AN, etc. If desired, the servers within a region may be independent with respect to other servers within that region, such as by having power, cooling, etc., facilities which are different than those facilities of other servers in that region.

The client computer 10 may connect to a network 20 via a communication link 15. One or more of the regional storage systems 30A-30N may connect to the network 20 via communications links 25A-25N. The network 20 may be, for example, the Internet. For convenience of illustration and discussion, the client computer 10 and the several and various regional storage systems 30 are shown as being connected to the same network 20. In practice, however, the client computer 10 may have access to, for example, only one regional storage system, such as regional storage system 30A, and may have access only to one server, such as server 30A1, and the servers 30A1-30AN may be connected to each other, and/or to servers in other regional storage systems 30B-30N via another network, such as a secure, internal data network. The particular types and numbers of networks and connections used are typically selected based on the desired security, data speed, cost of service, etc.

Assume now that a client has a data file that the client wishes to have backed up at a location other than at the client's site. In order to accomplish this, a client computer 10 connects with a server in one of the regional storage systems 30. For example, the client computer 10 might connect with server 30A1 in regional storage system 30A via communications links 15 and 25A and network 20. After any desired authentication and permission communications, the server 30A1 receives and accepts the data file from the client computer 10.

In response to receiving the data file, the server 30A1 may identify a particular XOR-based m-of-n erasure-coding technique to be used and a particular encryption technique and/or encryption key to be used, encrypt the data file, and erasure-encode the encrypted file to produce encrypted fragments. Server 30A1 may also send the data file and an identification of the erasure-coding technique to a server in at least one other regional storage system 30. For example, the server 30A1 may send the data file and the identification of the erasure-encoding technique to server 30B2 in regional storage system 30B. The particular erasure-coding technique to be used may be based on factors such as the size of the file, the number of fragments desired, the number of regional storage systems over which the fragments will be repeated, redundancy, etc. Alternatively, the particular erasure-coding technique to be used may be fixed (predetermined), in which case server 30A1 may send only the data file to the server 30B2. The encryption technique is a bit-by-bit XOR encryption technique, such as but not limited to a block-cipher encryption technique, such as but not limited to the counter-mode (CTR) encryption technique. The encryption technique generates a stream of bits, sometimes referred to as an encryption vector. The data file and the encryption vector may be delineated into "blocks".

When an XOR-based erasure-encoding technique and an XOR encryption technique are used, and the encryption vector block size is the same as the data block size, then there are at least two ways of producing an encrypted, erasure-encoded file from a data file:

(1) a data file may be encrypted by XORing the data file with the encryption vector, and the result then erasure-encoded to produce encrypted, erasure-encoded fragments, which process may be represented as $$F=E(D \text{ XOR } V)$$

where F are the encrypted fragments representing the encrypted, erasure-encoded data file, E is the erasure-encoding scheme, D is the data file, V is the encryption vector, which is the bit stream produced by the particular XOR encryption scheme being used, and XOR is the bit-by-bit exclusive-OR operation; and (2) the data file may be erasure-encoded, the encryption vector may be erasure-encoded, and then the two erasure-encoded files XOR'd to produce the encrypted, erasure-encoded fragments, which process may be represented as $$F=E(D) \text{ XOR } E(V).$$

Both of these techniques produce an identical plurality of n encrypted fragments. The erasure-encoding process may require substantial computing power and time, so process (1) is preferred because only one erasure-encoding process is performed, whereas in process (2) two erasure-encoding processes are performed.

Server 30A1 therefore produces encrypted fragments which represent the encrypted, erasure-encoded data file by one of those processes. Server 30A1 may then distribute one or more copies of one or more of the encrypted fragments to other servers 30A2-30AN in regional storage system 30A.

Server 30B2 receives the data file and may also receive information regarding the erasure-encoding technique to be used, especially if the erasure-encoding technique is not predetermined. Server 30B2 then produces encrypted fragments by one of those processes discussed above, the encrypted fragments representing the encrypted, erasure-encoded data file. Server 30B2 may distribute one or more copies of one or more of the encrypted fragments to other servers 30B1, 30BN in regional storage system 30B. If servers 30A1 and 30B2 operate on the same data file using the same erasure-encoding technique and the same encryption technique then the fragments produced by both servers will be non-overlapping and identical.

As another option, the server 30A1 may encrypt the data file and then send the encrypted data file to server 30B2. Servers 30A1 and 30B2 then apply the selected or predetermined erasure-encoding technique to the encrypted data file. Server 30A1 and server 30B2 may distribute one or more copies of some or all of the encrypted erasure-encoded fragments to other servers in their respective regions. This has the advantage that only one server has to perform the encryption process, but has the disadvantage that the non-encrypting server cannot decrypt the information without being advised of the encryption process that the encrypting server uses, thereby possibly weakening the security provided by different servers not knowing what encryption scheme any other server uses.

Not all n of the encrypted fragments are required in order to erasure-decode an erasure-encoded file, a predetermined number m of non-identical, non-overlapping fragments is adequate to erasure-decode an erasure-encoded file so the other fragments, up to n–m fragments, may be considered to be unnecessary and may be discarded, and the erasure-decoding operation is based on the remaining, at least m, fragments. To provide some redundancy, preferably, but not necessarily, one or more copies of the remaining (non-discarded) fragments are distributed among and stored on one or more servers in one or more regions. Even more preferably, at least two servers are in different regions.

After at least an adequate number m of valid, non-overlapping, non-identical fragments of the encrypted, erasure-encoded file has been retrieved, there are at least two ways to recover the data file when the data block size is the same as the encryption vector block size:

(1) the retrieved fragments of the encrypted, erasure-encoded file may be erasure-decoded to produce an encrypted file, and then this is decrypted by XORing the encrypted file with the encryption vector to produce the reconstructed data file, which process may be represented as $$D=E'(F')XOR\ V$$

where E' is the erasure-decoding scheme, F' is at least m valid, non-overlapping, non-identical fragments, and D and V are as above; and (2) the retrieved fragments of the encrypted, erasure-encoded file may be XOR'd with the erasure-encoded encryption vector, and the result erasure-decoded to produce the reconstructed data file, which process may be represented as $$D=E'(F'\ XOR\ E(V)).$$

The erasure-decoding process may require substantial computing power and time, so process (1) is preferred because erasure-decoding is only performed once, whereas in process (2) erasure-decoding is required and erasure-encoding (of the encryption vector) is also required unless the erasure-encoded encryption vector was previously stored when the data file was first encrypted. Process (2), however, provides the benefit that the decryption can be done on a fragment-by-fragment basis. For example, if server 30A1 and a server 30B1 use different encryption schemes, of the type mentioned herein, then each server can decrypt the fragments that it finds in its own domain to provide decrypted, erasure-coded fragments. These decrypted fragments can then be combined and erasure-decoded to produce the original data file.

If the same erasure-encoding technique is used then the non-encrypted fragment 1 from server 30A1 will be the same as the non-encrypted fragment 1 from server 30B2, the non-encrypted fragment 2 from server 30A1 will be the same as the non-encrypted fragment 2 from server 30B2, etc., even though the encrypted fragments may and probably will appear to be different because of the different encryption techniques being applied by the servers in the different regions. Therefore, as long as all of the regions 30 collectively possess an adequate number m of fragments then the original file can be reconstructed, even if no server or region has sufficient valid fragments by itself to reconstruct the original data file, and even if the different servers or regions use different encryption techniques.

Server 30A1 and server 30B2 may use the same or different XOR encryption techniques of the type mentioned herein, may use the same or different encryption keys, and may or may not communicate the encryption technique used and/or key(s) used to each other. Preferably, for convenience, the servers use the same XOR encryption scheme, but use different encryption keys. Also, preferably, to maintain security and to maintain independence between the servers, the servers do not communicate to each other the particular XOR encryption technique used and/or key(s) used, even if the servers use the same encryption technique but use different keys.

In one implementation, a server, or the servers in a region, will only receive and store enough encrypted fragments to allow reconstruction of the original data file, and each server may store a different fragment or different combination of fragments. It is also contemplated that, in another implementation, an individual server may not store enough of the encrypted fragments to reproduce the original data file on its own. By way of example, and not of limitation, if there are three servers, and four of eight encrypted fragments are necessary to reconstruct a data file then one server may store encrypted fragments 1, 2 and 3, a second server may store encrypted fragments 1, 2 and 4, and a third server may store encrypted fragments 2, 3 and 4. Thus, even if one server fails completely, or each server loses a file, two or more servers will collectively still have enough non-identical encrypted fragments to allow reconstruction of the original data file.

Suppose, however, that there is some event which causes a loss of data on the client computer 10, and which also causes a loss of data on one or more servers in one or more regional storage systems 30A-30N. The client will then use a client computer 10 to connect with a regional storage server, such as but not limited to server 30A1, and request that the stored data file(s) be retrieved and sent to the client computer 10. The server 30A1 will then attempt to retrieve enough (m) fragments to reconstruct the data file.

In an effort to obtain sufficient valid fragments to reconstruct a data file, server 30A1 may search its own memory for encrypted fragments, then serially ask one or more other servers 30A2-30AN in regional storage system 30A for one or more specific fragments or for all fragments, and then serially ask one or more other servers in regional storage systems 30B-30N for one or more specific fragments or for all fragments. As another option server 30A1 may sequentially ask different groups of servers and/or regions for one or more specific fragments or for all fragments. As another option, server 30A1 may simultaneously ask all servers in one or more regional storage systems 30A-30N for one or more specific fragments or for all fragments. A broad request, such as simultaneously asking all servers or regions for all fragments at the beginning, rather than in a serial fashion, increases the network bandwidth used by the process, but may result in a sufficient number of fragments being produced more quickly, and therefore the reconstructed file may be produced more quickly. Once the server 30A1 has a sufficient number of valid, different, non-overlapping fragments then server 30A1 may use the collected fragments to reconstruct the data file and send the reconstructed data file(s) to the client computer 10.

As mentioned, a server in another regional storage system 30B-30N may either send decrypted fragments and/or data blocks to server 30A1, or may send encrypted fragments and/or data blocks, along with decrypting information (encryption technique, key) to server 30A1 so that server 30A1 can decrypt the encrypted fragments and/or data blocks. Preferably, to maintain security and to maintain independence between the servers, the servers do not communicate the particular XOR encryption technique used and/or key(s) used to each other. Preferably, a server in another regional storage system 30B-30N decrypts the encrypted fragments and/or data blocks that it has and sends decrypted fragments to server 30A1.

It is possible, due to an extreme event or a sequence of extreme events, that there may not be enough valid fragments and/or data blocks to allow reconstruction of the original data file provided by a user, for example, in an m-of-n erasure-encoding technique where only m−1 valid fragments can be recovered. It is possible, however, that the user, inadvertently or as a precautionary measure, may have stored the same file more than once, or stored the same file in two or more different regions. It is also possible that one or more other users may have also stored the same file. Further, different encryption techniques may have been used by the different servers or regions. In those situations, if the file, the fragments, and/or data blocks that are the same can be identified and related to the original file then it may still be possible to reconstruct the file.

If the receiving server, such as server 30A1, creates encrypted fragments from the data file and causes encrypted fragments to be stored on servers in other regions, then the server 30A1 may affix metadata to the encrypted fragments which shows a relationship of the fragment to the original file, or there may an index or reverse index which associates the encrypted fragments to the original data file. Then, when server 30A1 requests fragments from another region, such as region 30B for example, region 30B can quickly locate the encrypted fragments and send the located fragments to server 30A1 for use in reconstructing the original data file. If the receiving server, such as server 30A1, sends the original data file to a server on another region, and that server performs its own encryption and erasure-encoding, then the server 30A1 may also send metadata to be affixed by the server in region 30B to the encrypted fragments, or the server in region 30B may create and affix such metadata to the encrypted fragments, or create an index or reverse index which associates the encrypted fragments to the original data file. Then, when server 30A1 requests fragments from another region, such as region 30B for example, region 30B can quickly locate the encrypted fragments, decrypt them, and send the decrypted fragments to server 30A1 for use in reconstructing the original data file.

One option for identifying such duplicate fragments is to attach a unique identifier to each fragment. A simple example of such an identifier is the checksum of the data file, another is a checksum of the fragment, and both checksums may be used if desired. As another example, a cryptographic hash of the original, complete data file can be created and stored as metadata with the encrypted data. Preferably, but not necessarily, an index, or reverse index, is created and maintained which identifies each file by an associated checksum value, hash value, and/or other identifier.

If a high-fidelity hash algorithm is used then, if that same file is stored by two different users, then both files would have the same hash value. There is little likelihood, however, that two unrelated files will have the same hash value so the hash value may be used to identify related files and fragments. A high-fidelity hash algorithm provides better resolution for identifying same/different files, but a high-fidelity hash algorithm can provide an insight into the data itself. That is, it may "leak" the data, thus reducing the benefit of encryption. One solution to this data leakage problem is to encrypt the hash value as well—that is, at least some of the metadata is also encrypted.

Another solution to this data leakage problem is to use a lower-fidelity hash algorithm. This increases the risk that the fragments for two or more unrelated files may have the same hash value, especially if a storage system (regional storage systems 30A-30N) is used to store data for multiple, large clients. For example, if three files have the same hash value, then the attempt to find fragments with that hash value may locate a useful fragment, but may also locate those fragments from other files which have the same hash value but are not useful. In that case, a checksum may be used to further distinguish the located files. Preferably, but not necessarily, the encrypted hash value is stored in an index or in a reverse index.

Also, each fragment produced by an erasure-encoding process has a "tag" or "index" or other identification number, typically stored as metadata for the fragment, which identifies where the fragment is in the order of fragments. For example, the fragment might be labeled "1", "5", etc.

Thus, if two or more fragments have the same hash value or checksum, the fragment number may be examined to determine which fragment, if any, is likely to be the correct fragment. The fragment identification number is a type of metadata and, typically is neither erasure-encoded nor encrypted. For example, if the newly-located fragment has "3" for its position in the order of the fragments, and a valid fragment having "3" for its position has already been found then another fragment having this same identification or location number is either a duplicate or is part of an unrelated file, and therefore would not be useful in reconstructing a candidate data file. If, however, the fragment order is "4", and there is no other fragment "4", then this fragment might be useful in reconstructing a candidate data file. Even then, it is possible that two or more fragments might meet the specified hash value and position number, such as where a client has accidentally or intentionally saved the same file more than once.

A next or further test to identify valid, related files might be to reconstruct two or more candidate data files from these fragment files, and then examine the candidate data files to determine which candidate data file appears to be correct. The examination may be done, for example, by reconstructing candidate files using the located fragments in conjunction with other fragments to determine whether two or more of the resulting candidate files are identical. For example, assume that three valid fragments are required to reconstruct a data file, but that only two of them have been located. One can then use the hash value to locate other fragments. Assume, for example, that three fragments having the specified hash value are then found. The two known fragments are then used with each of the other three fragments to create three candidate data files, which are then compared to each other by any convenient, available means, such as, but not limited to, generating a checksum for each candidate data file and comparing that to any checksum embedded in the candidate data file, or comparing the checksums for the different candidate data files to each other, or generating a hash value for each candidate data file and comparing that with the hash value that was erasure-encoded along with the data, or by bit-by-bit comparisons between the various candidate data files, etc. If matches are obtained, then those matching candidate data files are likely valid reconstructions. Also, if the original data file was text, as opposed to object code or raw data, then a human may be able to quickly review a candidate data file to determine its validity.

Another approach to identifying related fragments is to associate a "seed" or other identification number as metadata with the data file and then with each fragment after erasure-encoding. This seed value may or may not be encrypted. An index or reverse index of seeds and hash values or other document identification number is then created and maintained. Then, if two fragments have the same hash value, checksum value, or fragment identification value, they can be inspected to determine if the seed value matches the seed value of the desired document. The seed value may be random, may be a sequentially generated value, or may be a value generated by some other technique.

Yet another approach is to pick a random seed value, combine that random seed with the data, and generate a cryptographic-strength identification value or "signature". This information can then be inspected to identify the proper fragment if two or more fragments have the same hash value.

In one implementation, each region has enough fragments to reconstruct a data file, but regions do not share many, if any, of the same fragments. Thus, server 30A1 could erasure-encode the data file and then distribute some of the fragments to the other regional storage systems 30B-30N according to a predetermined technique, or the server 30A1 could send the data file to the other regional storage systems 30B-30N, which would then encrypt and erasure-encode the data file to produce encrypted fragments, and then each regional storage system 30 would only store certain of those encrypted fragments according to a predetermined technique. For example, if there are only two regional storage systems 30A and 30B, then system 30A might store the odd-numbered encrypted fragments and system 30B might store the even-numbered encrypted fragments.

As another example, if there are three regional storage systems 30A-30C, then system 30A might store the first, fourth, seventh, etc., encrypted fragments, system 30B might store the second, fifth, eighth, etc., encrypted fragments, and system 30C might store the third, sixth, ninth, etc., encrypted fragments. As another example, system 30A might store the first third of the encrypted fragments, system 30B might store the second third of the encrypted fragments, system 30C might store the last third of the encrypted fragments, etc. For example, if there are 15 encrypted fragments, system 30 might store encrypted fragments 1-5, system 30B might store encrypted fragments 6-10, and system 30C might store encrypted fragments 11-15. One can also randomly assign the server system 30 in which a particular encrypted fragment is to be stored.

Within a regional storage system 30, it is preferable, but not necessary, to store more than one copy of a fragment so that the regional storage system 30, such as but not limited to regional storage system 30A, can still reconstruct the data file even if one of the servers, such as but not limited to server 30A2, suffers a failure such that any fragments on server 30A2 are no longer available. It may be preferable, from a cost and memory space viewpoint, that a fragment be stored on enough servers to reduce the likelihood of loss of the ability to reconstruct the data file to an acceptable level. Thus, server 30A1 could erasure-encode the data file and then distribute some of the fragments to the other servers 30A2-30AN in regional storage system 30A according to a predetermined technique. For example, server 30A1 might store fragments 1 and 2, server 30A2 might store fragments 3 and 4, server 30A3 might store fragments 5 and 6, etc. As another example, if regional storage system 30A is storing fragments 1, 4, 7, etc., then server 30A1 might store fragments 1 and 10, server 30A2 might store fragments 4 and 13, server 30A3 might store fragments 7 and 16, etc.

Of course, as mentioned above, up to n-m of the fragments may be discarded and copies of the at least m remaining fragments distributed so that there are preferably at least two copies of each remaining fragment, and the copies may be in the same server or region or in different servers or regions.

If server 30A1 cannot collect a sufficient number of valid, different, non-overlapping fragments then server 30A1 may attempt to reconstruct the data file using recovered fragments and/or data blocks by using techniques such as, for example, those described in U.S. patent application Ser. No. 13/898,066, entitled "Recovery Of Corrupted Erasure-Coded Data Files", filed May 20, 2013, and in U.S. patent application Ser. No. 13/898,071, entitled "Recovery Of Corrupted Erasure-Coded Data Files", filed May 20, 2013, the disclosures of both of which are incorporated herein in their entirety by reference.

The data file reconstruction processes discussed herein are also applicable even if the different storage systems use the same encryption scheme, but this is less secure than if they use different encryption schemes. If the different storage systems use the same encryption scheme then, preferably, to avoid one system gaining knowledge about the encryption scheme used by another system, a system will decrypt an encrypted fragment before sending it to the other system.

Figure 2:
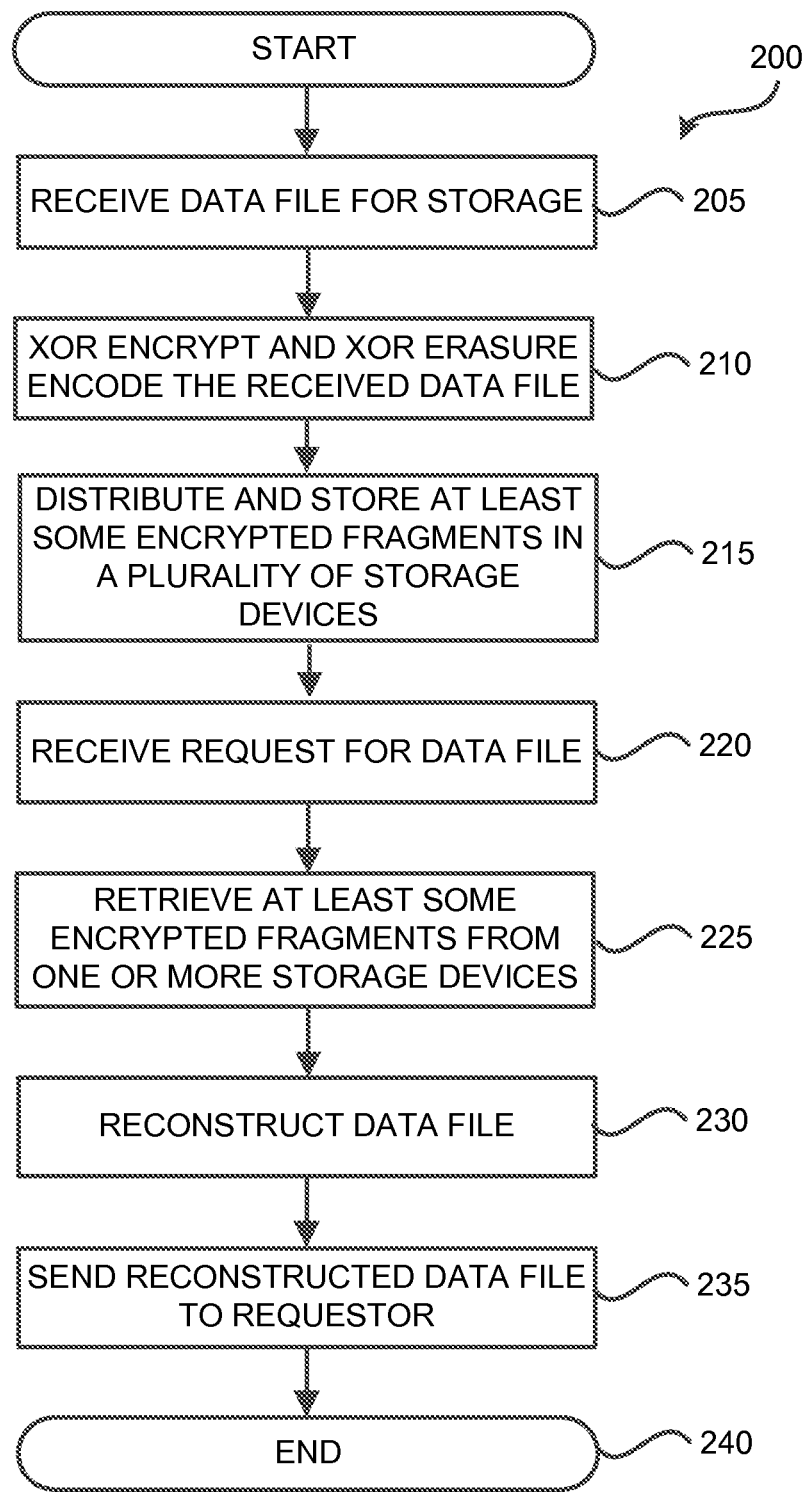
FIG. 2 is a flow diagram showing one routing that illustrates aspects of the overall encryption, erasure-encoding, storage, and recovery processes for the data.

FIG. 2 is a flow diagram showing the overall encryption, erasure-encoding, storage, and recovery processes for the data. It should be appreciated that the logical operations described herein with respect to FIG. 2, and the other figures herein, are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

The routine 200 begins at operation 205, where a server in a regional storage system, such as but not limited to server 30A1 in region 30A, after any desired authentication and permission communications, receives and accepts the data file from the client computer 10 for storage. Although many of the operations are described below as being performed by server 30A1 it will be appreciated, as discussed below, that some of the operations may be performed by other servers instead. The routine 200 then proceeds to operation 210, where the data file is exclusive-OR (XOR) encrypted and XOR-based erasure-encoded, as described above. At operation 215, at least some of the encrypted fragments are distributed and stored in a plurality of storage devices, such as but not limited to one or more of servers 30A1-30AN, and preferably, but not necessarily, one or more of the servers in the other regional storage systems 30B-30N.

If more than two regional storage systems are available, server 30A1 may select one or more of the regional storage systems for storage (at operation 215) of encrypted, erasure-encoded fragments based on factors, such as, but not limited to: the geographic distance of the remote server from server 30A1; the network bandwidth (speed and capacity) of networks connecting the remote server to server 30A1; the speed of the remote server; the total and available memory capacity of the remote server; the encryption and erasure-encoding techniques available at the remote server; current health of the remote server and the various components of the remote server, including but not limited to the specific storage device (512) where the erasure-encoded fragments are stored in that region; an aggregate measure of the health of the region (30B-30N); and the utilization of each region, including the current write/read rates in a region.

As mentioned herein, as only m fragments are needed to reconstruct a data file, so some fragments may not be stored. Also, a server will typically have some, but not necessarily all, of the remaining m encrypted fragments of a data file. Also, remaining encrypted fragment is preferably, but not necessarily, stored in at least one server, and preferably, but not necessarily, in at least two or more servers, but preferably not in all servers. This is to provide adequate redundancy for the fragments for reconstruction of the data file, even if some copies are lost, while avoiding excessive use of storage space. More copies of fragments provides a higher level of confidence that the data file can be reconstructed but this also requires more storage space and, therefore, may have a higher cost. Storing only one copy of one of the remaining fragments decreases storage space and cost, but increases the risk that a file may not be recoverable. As mentioned above, however, not all n of the encrypted fragments need be saved as m fragments are adequate for file reconstruction, so up to n−m fragments may be discarded. If only m encrypted fragments are to be stored then preferably, but not necessarily, each encrypted fragment is stored in at least two regions.

At operation 220, the server 30A1 receives a request to reconstruct the data file. The request may come from the client computer 10. Alternatively, if an event has occurred whereby data has been lost or damaged, such as a server failure, then a request may be automatically or manually generated to reconstruct the data file so that data in a failed server may be restored or so that the data can then be stored on another server.

The routine 200 then proceeds to operation 225, where the server 30A1 attempts to retrieve at least m non-identical, non-overlapping, valid fragments from its own memory, from one or more of the other servers in its own regional storage system 30A, and/or from one or more servers in one or more of the other regional storage systems 30B-30N. As mentioned herein, the retrieval of the fragments may be done as a series of requests of broadening scope, or in an all-at-once fashion.

At operation 230, the server 30A1 then attempts to reconstruct the data file from the retrieved fragments (unless another server or regional storage system has provided the reconstructed data file). The reconstructed data file is then sent at operation 235 to the requestor, such as the client computer 10 or to a process which is restoring a damaged server, etc. The reconstructed data file may be sent by server 30A1, or may be sent by a different server if desired, such as where a different server performed the reconstruction of the data file. The routine 200 then proceeds to operation 240, where it ends.

Typically, and as discussed in the related patent applications mentioned above, checksums and/or other data verification techniques may be used with a retrieved fragment to determine, at a simple level, whether the retrieved fragment is valid. Also, as discussed in those related patent applications, fragments may be selected in a manner that allows for more efficient recovery of the data file when one or more fragments have become corrupted. Further, and as also discussed in those related patent applications, fragments may be regenerated from data blocks when there are not enough valid fragments to reconstruct the data file.

Figure 3A:
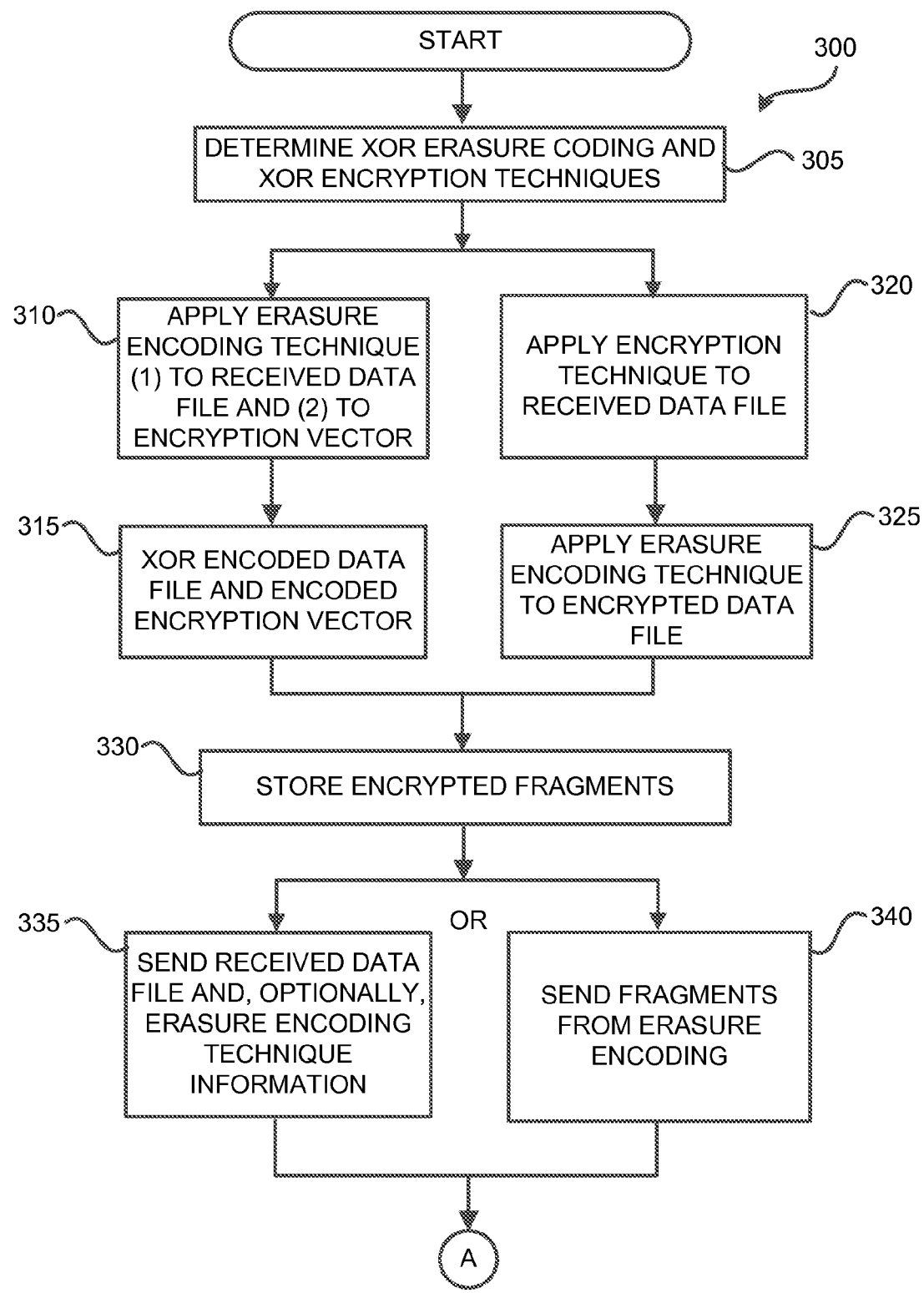
FIGS. 3A-3C are flow diagrams showing one routine illustrating aspects of various options for the erasure-encoding, encryption, distribution, retrieval, and reconstruction processes for the data.
Figure 3B:
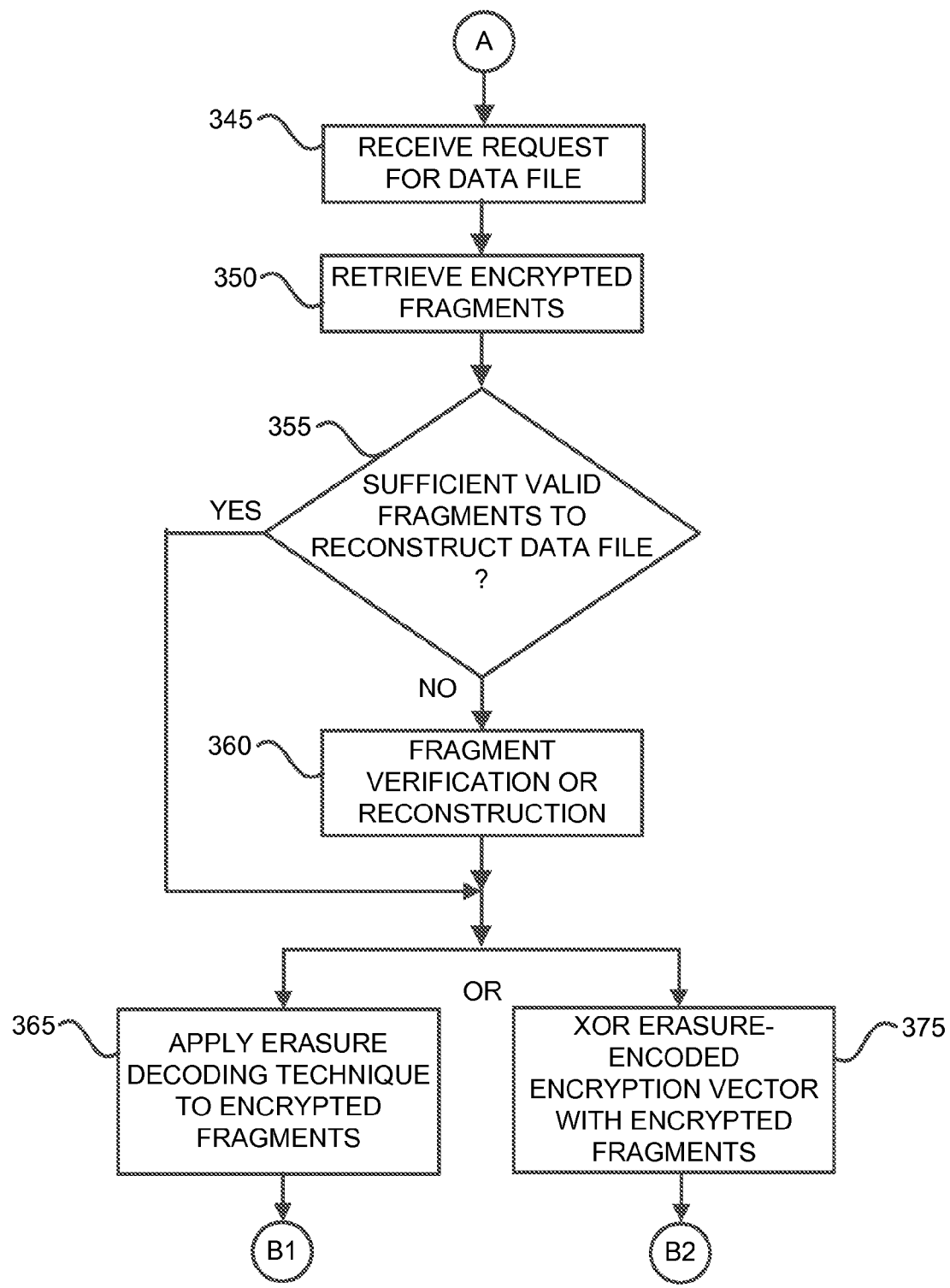
Figure 3C:
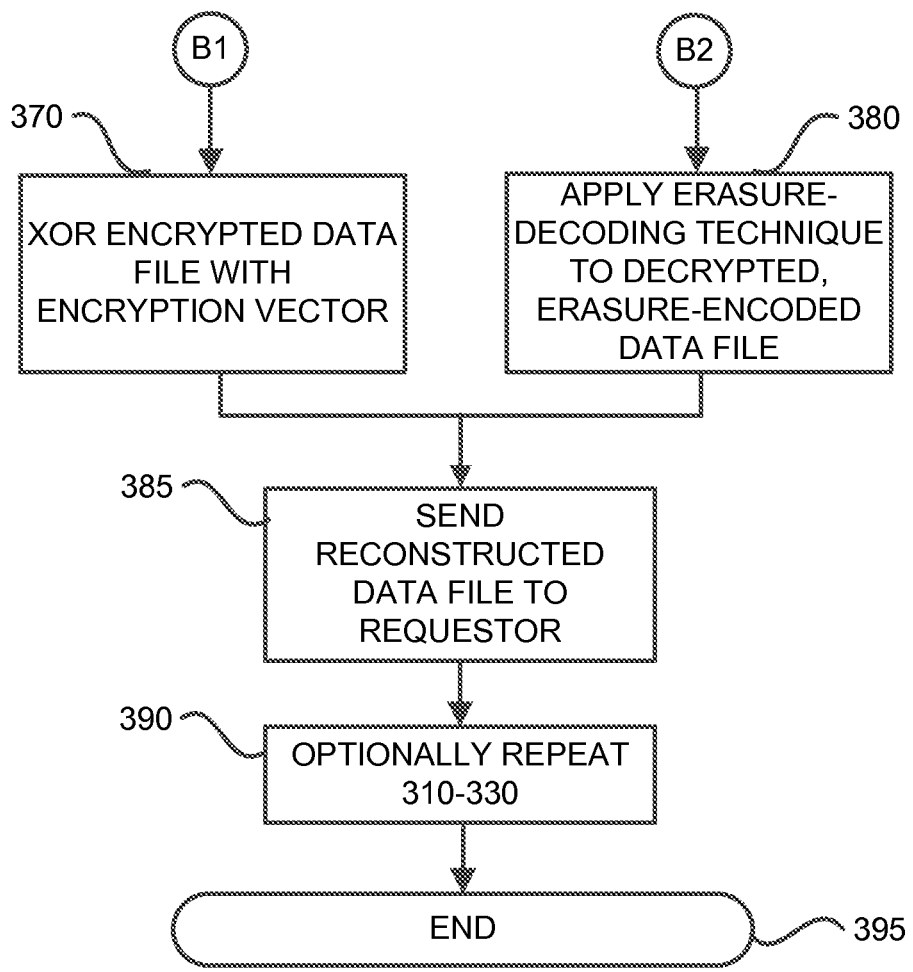

FIGS. 3A-3C are flow diagrams showing an illustrative routine 300 that illustrates aspects of various options for the erasure-encoding, encryption, distribution, retrieval, decryption, and reconstruction (erasure-decoding) processes for the data. The routine 300 begins at operation 305, where the server 30A1 determines the particular XOR-based erasure-encoding technique and particular XOR encryption technique to be used. As mentioned above, server 30A1 may always use the same techniques, or may use different techniques depending upon factors such as those factors mentioned above or other factors.

As mentioned, XOR-encryption and XOR-based erasure-encoding are used, so two options, 310-315 and 320-325 are shown. In option 310-315, server 30A1 applies at 310 the erasure-encoding technique to the received data file to generate the erasure-encoded fragments, separately applies the erasure-encoding technique to the encryption vector, and then, at operation 315, XORs the erasure-encoded data file with the erasure-encoded encryption vector. In option 320-325, server 30A1 applies at 320 the encryption technique to the received data file to generate an encrypted data file, and then applies at 325 the erasure-encoding technique to the encrypted data file. The results of both options are the same encrypted fragments. At operation 330 server 30A1 then preferably stores at least some of the encrypted fragments in its own memory devices and preferably sends at least some of the encrypted fragments to other servers 30A2-30AN for storage. As mentioned, preferably only m fragments are saved.

Options 335 and 340 are then shown. In option 335, server 30A1 sends the received data file and, optionally, information regarding the erasure-encoding technique, to one or more of the other regional storage systems 30B-30N. If the erasure-encoding technique is fixed, or if various servers use the same process to determine which erasure-encoding technique is to be used, then this information need not be sent. In option 340, server 30A1 sends the fragments from operation 310 to one or more of the other regional storage systems 30B-30N, which then performs the XOR encryption and stores one or more of the resulting encrypted fragments on one or more servers.

At operation 345, server 30A1 receives a request for the data file. At operation 350 server 30A1 then retrieves the encrypted fragments for that data file from its own memory devices and/or other servers or regions, as discussed above. At operation 355 server 30A1 then determines whether there are sufficient valid fragments to reconstruct the data file. If so, operation 365 is commenced. If not, then at operation 360 server 30A1 commences fragment verification or reconstruction, possibly using data blocks, as described in the two related patent applications mentioned above and, if successful, proceeds to operation 365.

At operation 365, server 30A1 commences decryption and reconstruction of the data file by applying the erasure-decoding technique to the encrypted fragments to produce an encrypted data file. Then, at operation 370, the encrypted data file is decrypted by XORing it with the encryption vector to provide the reconstructed data file. Alternatively, at operation 375, the encrypted fragments are XORd with the erasure-encoded encryption vector to provide decrypted fragments. Then, at operation 380, the erasure-decoding technique is applied to the decrypted fragments to provide the reconstructed data file. At operation 385 server 30A1 then sends the reconstructed data file to the requestor, such as the client computer 10, or to a process which is restoring a failed server, etc.

If data fragments have been lost and/or corrupted, then, at operation 390, server 30A1 optionally performs one or more of operations 310-330 on the reconstructed data file so that the various servers may all have the desired number of valid encrypted data fragments. The routine 300 may then end at operation 395.

Figure 4:
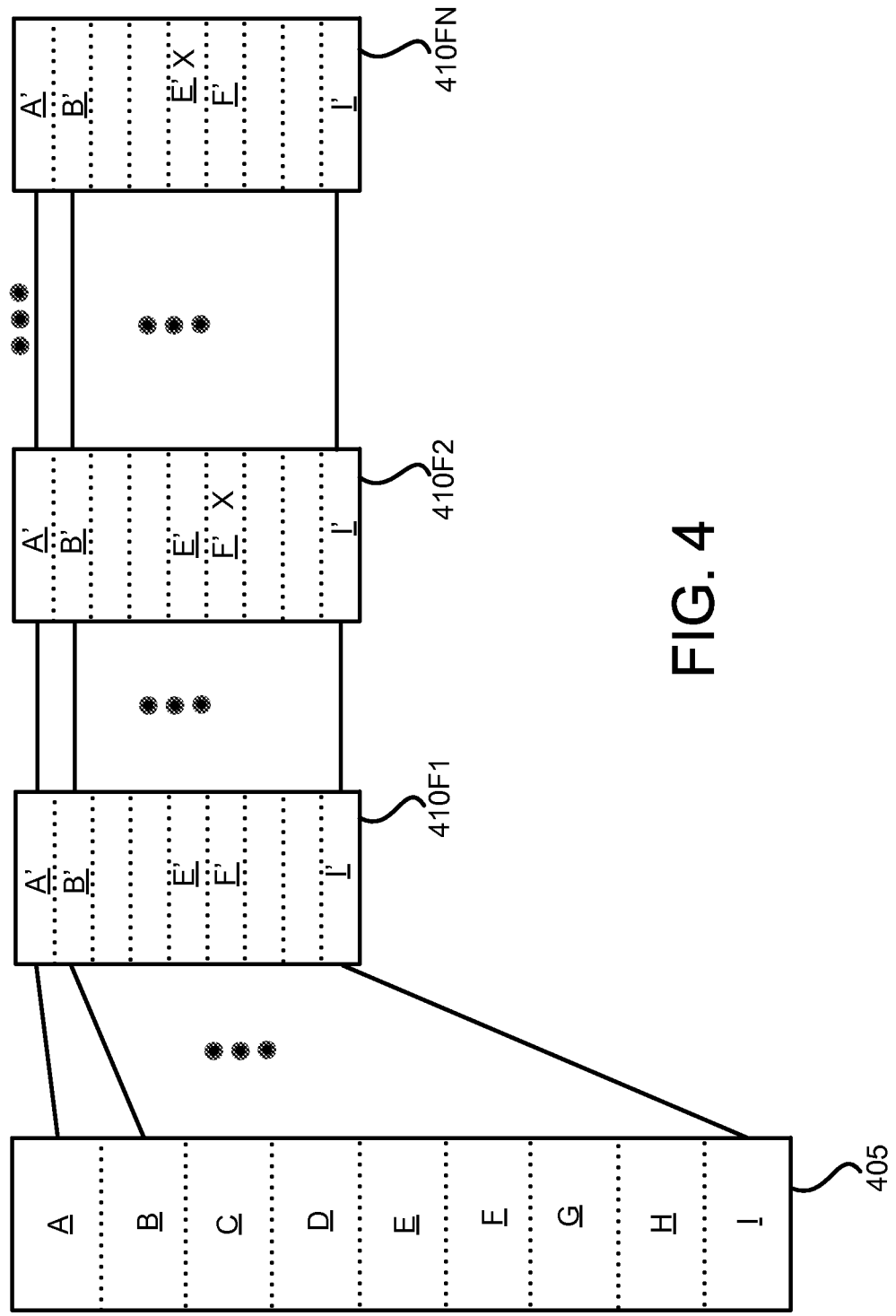
FIG. 4 is an illustration of a data file, data fragments, and data blocks therein.

FIG. 4 is an illustration of a data file 405, data fragments 410F1-410FN, and blocks A-I therein. As mentioned, for m-of-n erasure-encoding, a data file 405 is broken into a plurality of data blocks A-I. Each data block A-I is erasure-encoded to produce a corresponding fragment data block A'-I' for each of the fragments 410F1-410FN. Any m of the fragments, if not corrupted, can be used to reconstruct the data file 405. Also, as discussed herein, any m of the fragment blocks A'-I' can be used to reconstruct a corresponding data block A-I. Assume that fragment block 410F2F' and fragment block in fragment 410FNE' have been corrupted, as indicated by an X in those blocks. Therefore, these two fragments cannot be directly used to reconstruct the original data file 405. As long as there are m other good fragments, however, the original data file 405 can be reconstructed. If there are not enough good fragments, then m fragment blocks can be used to reconstruct a data block.

The various data blocks can be reconstructed using fragment blocks from different fragments. For example, data block 405A can be reconstructed using fragment blocks 410F1A, 410F2A, 410F3A, etc.; whereas data block 405F can be reconstructed using fragment blocks 410F1F, 410F3F, 410FNF, etc. Note that fragment block 410F2F is corrupted and would not result in the same data block as 410F1F, 410F3F, 410FNF, etc. However, this cannot be determined by looking at the fragment block itself, but can be identified by comparing the data blocks generated by various combinations of fragment blocks. If matching data blocks are obtained then it is presumed that they are valid reconstructions of the original data block as it is highly unlikely that a data block created from valid fragment blocks would be the same as a data block created from one or more corrupt fragment blocks. The checksum or a hash value for the data file 405 would be included as, for example, part of data block 405I, or associated with that data block, such as by a pointer or a table. Each fragment 410 may also have its own checksum and/or hash value, which would be included, as for example, part of fragment block 410FxI', or associated with that fragment, such as by a pointer or a table. The number of data blocks shown and discussed is for convenience of illustration and is not meant to suggest that only this number of data blocks can or should be used.

Figure 5:
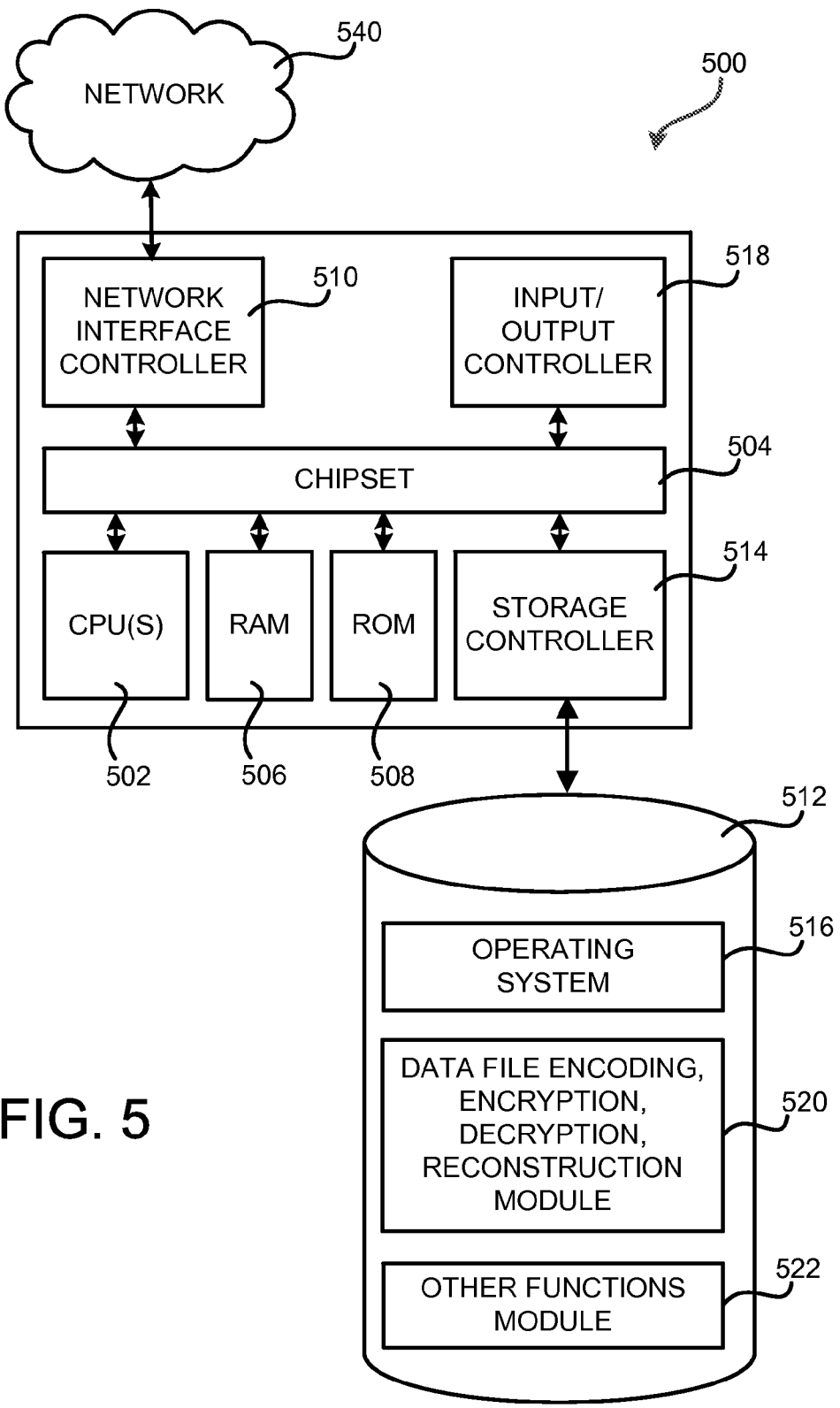
FIG. 5 is a computer architecture diagram showing exemplary computer architecture for a server or other computing device in a regional storage system that is capable of performing the functionality disclosed herein for storage and recovery of data files.

FIG. 5 is a computer architecture diagram showing an exemplary computer architecture for a server or other computing device, such as but not limited to server 30A1, in a regional storage system, such as but not limited to system 30A, and which is capable of performing the functionality disclosed herein for storage and recovery of data files. The computer architecture shown illustrates a conventional server computer, workstation, desktop computer, laptop, network appliance, or other computing device, and may be utilized to execute any aspects of the software components presented herein described as executing within the computing device and/or other computing devices mentioned herein.

The computer 500 includes a baseboard, or "motherboard," which is a printed circuit board to which a multitude of components or devices may be connected by way of a system bus or other electrical communication paths. In one illustrative computer, one or more central processing units ("CPUs") 502 operate in conjunction with a chipset 504. The CPUs 502 are standard programmable processors that perform arithmetic and logical operations necessary for the operation of the computer 500.

The CPUs 502 perform the necessary operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 504 provides an interface between the CPUs 502 and the remainder of the components and devices on the baseboard. The chipset 504 may provide an interface to a random access memory ("RAM") 506, used as the main memory in the computer 500. The chipset 504 may further provide an interface to a computer-readable storage medium such as a read-only memory ("ROM") 508 or non-volatile RAM ("NVRAM") for storing basic routines that that help to startup the computer 500 and to transfer information between the various components and devices. The ROM 508 or NVRAM may also store other software components necessary for the operation of the computer 500 as described herein.

The computer 500 may operate in a networked environment using logical connections to remote computing devices and computer systems through a network 540. The chipset 504 may include functionality for providing network connectivity through a network interface controller ("NIC") 510, such as a gigabit Ethernet adapter. The NIC 510 is capable of connecting the computer 500 to other computing devices over the network 540. It should be appreciated that multiple NICs 510 may be present in the computer 500, connecting the computer to multiple communication channels, multiple and other types of networks, remote server systems, and remote computing systems.

The computer 500 may be connected to a mass storage device 512 that provides non-volatile storage for the computer. The mass storage device 512 may store system programs, application programs, other program modules and data, which have been described in greater detail herein. The mass storage device 512 may be connected to the computer 500 through a storage controller 514 connected to the chipset 504. The mass storage device 512 may consist of one or more physical storage units. The storage controller 514 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 may store data on the mass storage device 512 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 512 is characterized as primary or secondary storage and the like.

For example, the computer 500 may store information to the mass storage device 512 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 may further read information from the mass storage device 512 by detecting the physical states or characteristics of one or more particular locations within the physical storage units.

In addition to the mass storage device 512 described above, the computer 500 may have access to other computer-readable storage medium to store and retrieve information, such as program modules, data structures, or other data. It should be appreciated by those skilled in the art that computer-readable storage media can be any available media that provides for the storage of non-transitory data and that may be accessed by the computer 500.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. Notwithstanding the above, computer-readable storage media, as used herein, specifically excludes interpretations thereof which are prohibited by applicable statutory and case law. For example, computer-readable storage media specifically excludes signals per se.

The mass storage device 512 may store an operating system 516 utilized to control the operation of the computer 500. According to one implementation, the operating system includes a member of the LINUX family of operating systems. According to another implementation, the operating system includes a member of the WINDOWS® SERVER family of operating systems from MICROSOFT Corporation in Redmond, Wash. According to another implementation, the operating system may include a member of the UNIX or SOLARIS families of operating systems. It should be appreciated that other operating systems may also be utilized.

The mass storage device 512 may also store other system or application programs, modules, and/or data utilized by the computer 500 such as: a module 520 that performs data file erasure-coding, encryption, decryption, and/or reconstruction; and a module 522 that performs other functions mentioned herein, such as but not limited to algorithms for selecting an erasure-coding technique, for selecting an encryption technique, for selecting seed values, for computing checksum values, for computing hash values, for determining which fragments are to be distributed to which locations, for reconstructing a data file from the selected fragments, for attempting recovery of a data file when one or more fragments have been corrupted, for attempting recovery of data blocks and reconstruction of fragments and/or a data file based thereon, etc.

The mass storage device 512 or other computer-readable storage media is encoded with computer-executable instructions that, when loaded into the computer 500, transform the computer from a general-purpose computing system into a special-purpose computer capable of performing the various operations, processes, and functions described herein. These computer-executable instructions transform the computer 500 by specifying how the CPUs 502 transition between states, as described above. According to one implementation, the computer 500 has access to computer-readable storage media storing computer-executable instructions which, when executed by the computer 500, perform aspects of one or more of the methods or procedures described herein.

The computer 500 may also include an input/output controller 518 for receiving and processing input from a number of input devices, such as a keyboard, a mouse, a touchpad, a touch screen, an electronic stylus, a microphone for receiving voice commands, or other type of input device. Similarly, the input/output controller 518 may provide output to a display, such as a computer monitor, a flat-panel display, a digital projector, a printer, a plotter, a speaker, headphones, or other type of output device. It will be appreciated that the computer 500 may not include all of the components shown herein, may include other components that are not explicitly shown herein, or may utilize an architecture completely different than that shown herein. Additionally, although the exemplary computer architecture shown and discussed herein is directed to a server computer, this general architecture is also suited for the client computer 10, the primary difference being the use of different modules or programs in the mass storage device 512 so as to provide for implementation of the different functions performed by the particular device.

Based on the foregoing, it should be appreciated that technologies for reliably storing and reconstructing data files with encryption have been presented herein. Although the subject matter presented herein has been described in language specific to computer structural features, methodological acts, transformative acts, specific computing machinery, and computer readable media, it is to be understood that the appended claims are not necessarily limited to the specific features, acts, or media described herein. Rather, the specific features, acts and mediums are disclosed as exemplary forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the exemplary implementations, processes, procedures, functions or applications illustrated and described, and without departing from the true spirit and scope of the present invention, which is set forth in the following claims.

What is claimed is:

1. A computer-implemented method for storing and recovering a data file, the method comprising:
   receiving a data file for storage;
   producing encrypted, erasure-encoded fragments from the received data file by using first and second exclusive-OR (XOR) encryption techniques, and by using an XOR-based erasure-encoding technique, the second XOR encryption technique being different than the first XOR encryption technique;
   storing at least some of the encrypted, erasure-encoded fragments in a plurality of storage devices, each storage device storing at least one of the encrypted, erasure-encoded fragments;
   receiving a request to reconstruct the data file;
   retrieving a number of encrypted, erasure-encoded fragments adequate to reconstruct the data file; and
   reconstructing the data file from the retrieved, encrypted, erasure-encoded fragments.

2. The computer-implemented method of claim 1 wherein at least some of the encrypted, erasure-encoded fragments are produced using the first XOR encryption technique and the XOR-based erasure-encoding technique, and at least some others of the encrypted, erasure-encoded fragments are produced using the second XOR encryption technique and the XOR-based erasure-encoding technique, the first and second XOR encryption techniques using different encryption algorithms, different encryption keys, or both.

3. The computer-implemented method of claim 1 wherein storing the at least some of the encrypted, erasure-encoded fragments in a plurality of storage devices comprises storing at least one of the encrypted, erasure-encoded fragments in a first storage device, and storing another of the encrypted, erasure-encoded fragments in a second storage device, the first storage device and the second storage device being independent with respect to each other.

4. The computer-implemented method of claim 1 wherein producing encrypted, erasure-encoded fragments comprises either:
   encrypting the data file using the first XOR encryption technique and erasure-encoding the encrypted data file using the XOR-based erasure-encoding technique to produce the encrypted, erasure-encoded fragments; or erasure-encoding the data file using the XOR-based erasure-encoding technique, erasure-encoding an encryption vector from the first XOR encryption technique using the XOR-based erasure-encoding technique, and then XORing the erasure-encoded data file and the erasure-encoded encryption vector to produce the encrypted, erasure-encoded fragments.

5. The computer-implemented method of claim 1 wherein:
receiving the data file for storage comprising receiving the data file a first time and receiving the data file a second time;
producing encrypted, erasure-encoded fragments from the received data file comprises producing first encrypted, erasure-encoded fragments from the data file received the first time by using the first XOR encryption technique and the XOR-based erasure-encoding technique, and producing second encrypted, erasure-encoded fragments from the data file received the second time by using the second XOR encryption technique and the XOR-based erasure-encoding technique; and
storing at least some of the encrypted, erasure-encoded fragments in a plurality of storage devices comprises storing at least one of the first encrypted, erasure-encoded fragments in a first storage device of the plurality of storage devices and storing at least one of the second encrypted, erasure-encoded fragments in a second storage device of the plurality of storage devices.

6. The computer-implemented method of claim 1 wherein storing the at least some of the encrypted, erasure-encoded fragments in a plurality of storage devices comprises storing at least one of the encrypted, erasure-encoded fragments in a first storage device, and storing at least one of the encrypted, erasure-encoded fragments in a second storage device, the first storage device and the second storage device being independent with respect to each other.

7. The computer-implemented method of claim 1 wherein reconstructing the data file from the retrieved, encrypted, erasure-encoded fragments comprises:
(1) combining the retrieved, encrypted, erasure-encoded fragments to produce combined fragments, erasure-decoding the combined fragments to produce erasure-decoded fragments, and decrypting the erasure-decoded fragments; or
(2) individually decrypting the retrieved, encrypted, erasure-encoded fragments to provide decrypted, erasure-encoded fragments, combining the decrypted fragments, and erasure-decoding the combined decrypted fragments.

8. The computer-implemented method of claim 1 wherein reconstructing the data file from the retrieved, encrypted, erasure-encoded fragments comprises:
decrypting the retrieved, encrypted, erasure-encoded fragments which were produced using the first encryption technique to provide first erasure-encoded fragments;
decrypting the retrieved, encrypted, erasure-encoded fragments which were produced using the second encryption technique to provide second erasure-encoded fragments;
combining the first erasure-encoded fragments and the second erasure-encoded fragments; and
erasure-decoding the combined, erasure-encoded fragments.

9. The computer-implemented method of claim 1 wherein retrieving a number of encrypted, erasure-encoded fragments adequate to reconstruct the data file comprises:

retrieving the retrieved, encrypted, erasure-encoded fragments which were produced using the first encryption technique from a first storage device; and
retrieving the retrieved, encrypted, erasure-encoded fragments which were produced using the second encryption technique from a second, independent storage device.

10. A computer-implemented method for a computer system for storing and recovering a data file, the method comprising:
receiving a data file for storage;
producing encrypted, erasure-encoded fragments from the received data file using a first exclusive-OR (XOR) encryption technique and an XOR-based erasure-encoding technique, the second XOR encryption technique being different than the first XOR encryption technique;
storing at least one of the encrypted, erasure-encoded fragments in at least one storage device;
either (1) sending the data file to a regional storage system for XOR encryption using a second XOR encryption technique and the XOR-based erasure-encoding technique, and for storage of at least one encrypted, erasure-encoded fragments produced thereby, or (2) generating fragments from the data file using the XOR-based erasure-encoding technique, and sending the fragments to a regional storage system for XOR encryption using a second XOR encryption technique, and for storage of at least one of the encrypted, erasure-encoded fragments produced thereby;
receiving a request to reconstruct the data file;
retrieving a number of encrypted, erasure-encoded fragments adequate to reconstruct the data file; and
reconstructing the data file from the retrieved, encrypted, erasure-encoded fragments.

11. The computer-implemented method of claim 10 wherein the first and second XOR encryption techniques use different encryption algorithms, different encryption keys, or both.

12. The computer-implemented method of claim 10 wherein storing at least one of the encrypted, erasure-encoded fragments in at least one storage device comprises storing the at least one of the encrypted, erasure-encoded fragments in a first storage device associated with the computer system; and further comprising:
storing another of the encrypted, erasure-encoded fragments in a second storage device, the second storage device being independent of the first storage device.

13. The computer-implemented method of claim 10 wherein the regional storage system is independent of the computer system.

14. The computer-implemented method of claim 10 wherein producing encrypted, erasure-encoded fragments from the received data file comprises either:
encrypting the received data file using the first XOR encryption technique and erasure-encoding the encrypted data file using the XOR-based erasure-encoding technique to produce the encrypted, erasure-encoded fragments; or
erasure-encoding the received data file using the XOR-based erasure-encoding technique, erasure-encoding an encryption vector from the first XOR encryption technique using the XOR-based erasure-encoding technique, and then XORing the erasure-encoded data file and the erasure-encoded encryption vector to produce the encrypted, erasure-encoded fragments.

15. The computer-implemented method of claim 10 wherein reconstructing the data file from the retrieved, encrypted, erasure-encoded fragments comprises:

(1) combining the retrieved, encrypted, erasure-encoded fragments, erasure-decoding the combined fragments to produce an encrypted data file, and decrypting the encrypted data file; or (2) individually decrypting the retrieved, encrypted, erasure-encoded fragments to provide decrypted, erasure-encoded fragments, combining the decrypted, erasure-encoded fragments, and erasure-decoding the decrypted, erasure-encoded fragments.

16. The computer-implemented method of claim 10 wherein retrieving a number of encrypted, erasure-encoded fragments adequate to reconstruct the data file comprises:

retrieving encrypted, erasure-encoded fragments from the at least one storage device;

decrypting the retrieved encrypted, erasure-encoded fragments to provide first decrypted, erasure-encoded fragments;

receiving second decrypted, erasure-encoded fragments from the regional storage system;

combining the first decrypted, erasure-encoded fragments and the second decrypted, erasure-encoded fragments; and erasure-decoding the combined decrypted, erasure-encoded fragments.

17. A system for storing and recovering a data file, the system comprising a computer, the computer comprising:

a memory device containing operating instructions and files:

a network interface device for sending and receiving data over a network;

a processor, communicatively coupled to the memory device and to network interface device, the processor executing operating instructions to:

receive a data file for storage;

produce encrypted, erasure-encoded fragments from the received data file using a first exclusive-OR (XOR) encryption technique and an XOR-based erasure-encoding technique;

store at least one of the encrypted, erasure-encoded fragments in at least one storage device;

either (1) send the data file to a regional storage system for XOR encryption using a second XOR encryption technique and the XOR-based erasure-encoding technique, and for storage of at least one encrypted, erasure-encoded fragments produced thereby, or (2) generate fragments from the data file using the XOR-based erasure-encoding technique, and send the fragments to a regional storage system for XOR encryption using a second XOR encryption technique, and for storage of at least one of the encrypted, erasure-encoded fragments produced thereby;

the second XOR encryption technique being different than the first XOR encryption technique;

receive a request to reconstruct the data file;

retrieve a number of encrypted, erasure-encoded fragments adequate to reconstruct the data file; and reconstruct the data file from the retrieved, encrypted, erasure-encoded fragments.

18. The system of claim 17 wherein the computer produces encrypted, erasure-encoded fragments from the received data file by executing operating instructions:

to encrypt the received data file using the first XOR encryption technique and to erasure-encode the encrypted data file using the XOR-based erasure-encoding technique to produce the encrypted, erasure-encoded fragments; or to erasure-encode the received data file using the XOR-based erasure-encoding technique, to erasure-encode an encryption vector from the first XOR encryption technique using the XOR-based erasure-encoding technique, and then to XOR the erasure-encoded data file and the erasure-encoded encryption vector to produce the encrypted, erasure-encoded fragments.

19. The system of claim 17 wherein the computer reconstructs the data file from the retrieved, encrypted, erasure-encoded fragments by executing operating instructions:

(1) to combine the retrieved, encrypted, erasure-encoded fragments, to erasure-decode the combined fragments to produce an encrypted data file, and to decrypt the encrypted data file; or (2) to individually decrypt the retrieved, encrypted, erasure-encoded fragments to provide decrypted, erasure-encoded fragments, to combine the decrypted, erasure-encoded fragments, and to erasure-decode the combined fragments.

20. The system of claim 17 wherein the computer:

retrieves a number of encrypted, erasure-encoded fragments adequate to reconstruct the data file by executing operating instructions to retrieve first encrypted, erasure-encoded fragments from the at least one storage device and to retrieve second decrypted, erasure-encoded fragments from the regional storage system;

reconstructs the data file from the first encrypted, erasure-encoded fragments and the second encrypted, erasure-encoded fragments by executing operating instructions to decrypt the retrieved encrypted, erasure-encoded fragments to provide first decrypted, erasure-encoded fragments, to combine the first decrypted, erasure-encoded fragments and the second decrypted, erasure-encoded fragments, and to erasure-decode the combined decrypted, erasure-encoded fragments.

21. A computer-readable storage medium having computer-executable instructions stored thereupon for storing and recovering a data file and the instructions, when executed by a computer, cause the computer to:

receive a data file for storage;

produce encrypted, erasure-encoded fragments from the received data file using a first exclusive-OR (XOR) encryption technique and an XOR-based erasure-encoding technique;

store at least one of the encrypted, erasure-encoded fragments in at least one storage device;

either (1) send the data file to a regional storage system for XOR encryption using a second XOR encryption technique and the XOR-based erasure-encoding technique, and for storage of at least one encrypted, erasure-encoded fragments produced thereby, or (2) generate fragments from the data file using the XOR-based erasure-encoding technique, and send the fragments to a regional storage system for XOR encryption using a second XOR encryption technique, and for storage of at least one of the encrypted, erasure-encoded fragments produced thereby;

the second XOR encryption technique being different than the first XOR encryption technique;

receive a request to reconstruct the data file;

retrieve a number of encrypted, erasure-encoded fragments adequate to reconstruct the data file; and reconstruct the data file from the retrieved, encrypted, erasure-encoded fragments.

22. The computer-readable storage medium of claim 21, wherein the computer-readable storage medium has further computer-executable instructions stored thereupon to produce encrypted, erasure-encoded fragments from the received data file which, when executed by the computer, cause the computer:

to encrypt the received data file using the first XOR encryption technique and to erasure-encode the encrypted data file using the XOR-based erasure-encoding technique to produce the encrypted, erasure-encoded fragments; or to erasure-encode the received data file using the XOR-based erasure-encoding technique, to erasure-encode an encryption vector from the first XOR encryption technique using the XOR-based erasure-encoding technique, and then to XOR the erasure-encoded data file and the erasure-encoded encryption vector to produce the encrypted, erasure-encoded fragments.

23. The computer-readable storage medium of claim 21, wherein the computer-readable storage medium has further computer-executable instructions stored thereupon to reconstruct the data file from the retrieved, encrypted, erasure-encoded fragments which, when executed by the computer, cause the computer:

(1) to combine the retrieved, encrypted, erasure-encoded fragments, to erasure-decode the combined fragments to produce an encrypted data file, and to decrypt the encrypted data file; or (2) to individually decrypt the retrieved, encrypted, erasure-encoded fragments to provide decrypted, erasure-encoded fragments, to combine the decrypted, erasure-encoded fragments, and to erasure-decode the decrypted, erasure-encoded fragments.

24. The computer-readable storage medium of claim 21, wherein the computer-readable storage medium has further computer-executable instructions stored thereupon:

to retrieve a number of encrypted, erasure-encoded fragments adequate to reconstruct the data file which, when executed by the computer, cause the computer to retrieve first encrypted, erasure-encoded fragments from the at least one storage device and to receive second decrypted, erasure-encoded fragments from the regional storage system;

to reconstruct the data file from the first encrypted, erasure-encoded fragments and the second encrypted, erasure-encoded fragments which, when executed by the computer, cause the computer to decrypt the retrieved encrypted, erasure-encoded fragments to provide first decrypted, erasure-encoded fragments, to combine the first decrypted, erasure-encoded fragments and the second decrypted, erasure-encoded fragments, and to erasure-decode the combined decrypted, erasure-encoded fragments.

* * * * *